(12) United States Patent
Vuong

(10) Patent No.: US 9,020,975 B2
(45) Date of Patent: Apr. 28, 2015

(54) HANDHELD ELECTRONIC DEVICE WITH ASSISTED TEXT ENTRY USING EXISTING MESSAGE THREAD, AND ASSOCIATED METHOD

(71) Applicant: BlackBerry Limited, Waterloo (CA)

(72) Inventor: Thanh Vuong, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/182,637

(22) Filed: Feb. 18, 2014

(65) Prior Publication Data

US 2014/0164917 A1    Jun. 12, 2014

Related U.S. Application Data

(63) Continuation of application No. 13/602,437, filed on Sep. 4, 2012, now Pat. No. 8,694,543, which is a continuation of application No. 12/830,888, filed on Jul. 6, 2010, now Pat. No. 8,280,911, which is a continuation of application No. 11/423,986, filed on Jun. 14, 2006, now Pat. No. 7,778,957.

(51) Int. Cl.
*G06F 17/30* (2006.01)
*G06F 17/24* (2006.01)
(Continued)

(52) U.S. Cl.
CPC .............. *G06F 17/24* (2013.01); *G06F 17/276* (2013.01); *H04M 1/72552* (2013.01); *H04M 2250/70* (2013.01)

(58) Field of Classification Search
CPC ....................................................... G06F 17/30
USPC ................................................... 707/600–899
See application file for complete search history.

(56) References Cited

U.S. PATENT DOCUMENTS 5,649,215 A * 7/1997 Itoh .................................. 704/9
5,884,248 A    3/1999 Hall
(Continued)

FOREIGN PATENT DOCUMENTS

| EP | 1320023 | 6/2003 |
|---|---|---|
| GB | 2396940 | 7/2004 |
| WO | 9833111 | 7/1998 |
| WO | 03060451 | 7/2003 |
| WO | 2004010323 | 1/2004 |

OTHER PUBLICATIONS

European Search Report in corresponding European Application No. EP06253076.1, mailed by the European Patent Office on Aug. 17, 2006 (7 pages).

(Continued)

*Primary Examiner* — Isaac M Woo
(74) *Attorney, Agent, or Firm* — Fish & Richardson P.C.

(57) ABSTRACT

A method of facilitating the entry of text into a new message generated by a messaging application of a handheld electronic device is provided that includes receiving a command to reply to or forward a received message that is included within a message thread, scanning the message thread, identifying a plurality of words in the message thread, generating one or more word lists that include the identified words, and displaying the one or more word lists. The method further includes receiving a selection of a selected one of the words from the one or more word lists, and entering the selected one of the words into the new message. Also provided is an improved handheld electronic device that implements the described method.

18 Claims, 5 Drawing Sheets

(51) Int. Cl.
*G06F 17/27* (2006.01)
*H04M 1/725* (2006.01)

(56) References Cited

U.S. PATENT DOCUMENTS

| | | |
|---|---|---|
| 6,008,799 A | 12/1999 | Van Kleeck |
| 6,205,342 B1 | 3/2001 | Oakes et al. |
| 7,912,904 B2 | 3/2011 | Buchheit et al. |
| 2002/0154164 A1 | 10/2002 | Clapper |
| 2003/0023792 A1 | 1/2003 | Schneider |
| 2004/0038670 A1 | 2/2004 | Ando et al. |
| 2004/0164973 A1 | 8/2004 | Nakano et al. |
| 2005/0210402 A1 | 9/2005 | Gun et al. |
| 2005/0246365 A1 | 11/2005 | Lowles et al. |
| 2006/0069990 A1 | 3/2006 | Yozell-Epstein et al. |
| 2006/0174207 A1 | 8/2006 | Deshpande |

OTHER PUBLICATIONS

Communication in corresponding European Application No. EP06253076.1, mailed in European Patent Office on Jul. 26, 2007 (6 pages).

Communication in corresponding European Application No. EP06253076.1, mailed in European Patent Office on Jun. 13, 2008 (6 pages).

Communication in corresponding European Application No. EP06253076.1, mailed in European Patent Office on Jun. 3, 2009 (5 pages).

Office Action in corresponding Canadian Application No. 2,588,526, mailed by the Canadian Patent Office on Jul. 29, 2009 (2 pages).

Office Action in corresponding Canadian Application No. 2,588,526, mailed by the Canadian Patent Office on Jul. 29, 2010 (3 pages).

* cited by examiner

```
                    MON. JAN. 3, 2005
52──  12:45 P   JOHN SMITH ─56  56  60╲BASEBALL SCHEDULE
52──  12:02 P   ZIGLEVEIT JONES┘     ─TOMORROW'S PARTY
52──  10:02 A   STEVEN PATTON╮    60─LUNCH ?
52──   8:02 A   JAMES DOE╮    56   60─HAPPY HOUR TONIGHT
                              56     60
36─
```

*FIG.3*

```
                56              52
FROM: JOHN SMITH┘
TO: ANDREW WILLIAMS
CC: JAMES DOE           60
SUBJECT: BBALL SCHEDULE┘

Hi Andrew:
Is there a particular colour of shirt we should
62  wear or will be supplied bibs or jerseys?

Thanks
    John

```
FROM: JOHN SMITH
TO: ANDREW WILLIAMS
CC: JAMES DOE
SUBJECT: BBALL SCHEDULE
```

Dear John,
Thanks for the message. We will get

—Original Message—

Hi Andre
Is there
wear or

Thanks
John

| NOUNS (ALT#) | VERBS (SHIFT#) | LONG (FN#) |
|---|---|---|
| 1. shirt | 1. wear | 1. particular |
| 2. bibs | 2. supplied | 2. supplied |
| 3. jerseys |  | 3. colour |
| 4. colour |  | 4. jerseys |

FIG. 7

```
FROM: JOHN SMITH
TO: ANDREW WILLIAMS
CC: JAMES DOE
SUBJECT: BBALL SCHEDULE
```

Dear John,
Thanks for the message. We will get jerseys

—Original Message—

Hi Andre
Is there
wear or

Thanks
John

| NOUNS (ALT#) | VERBS (SHIFT#) | LONG (FN#) |
|---|---|---|
| 1. shirt | 1. wear | 1. particular |
| 2. bibs | 2. supplied | 2. supplied |
| 3. jerseys |  | 3. colour |
| 4. colour |  | 4. jerseys |

HANDHELD ELECTRONIC DEVICE WITH ASSISTED TEXT ENTRY USING EXISTING MESSAGE THREAD, AND ASSOCIATED METHOD

This is a continuation of co-pending application Ser. No. 13/602,437, filed Sep. 4, 2012, which is a continuation of application Ser. No. 12/830,888, filed Jul. 6, 2010, and issued as U.S. Pat. No. 8,280,911, which is a continuation of application Ser. No. 11/423,986, filed Jun. 14, 2006, and issued as U.S. Pat. No. 7,778,957, all of which are incorporated herein by reference.

BACKGROUND

1. Technical Field

The concept disclosed herein relates generally to handheld electronic devices and, more particularly, to a handheld electronic device that provides assisted entry of text based upon an existing message thread.

2. Description of the Related Art

Numerous types of handheld electronic devices are known. Examples of such handheld electronic devices include, for instance, personal data assistants (PDAs), handheld computers, two-way pagers, cellular telephones and the like. Many handheld electronic devices also feature a wireless or other communication capability, although other handheld electronic devices are stand-alone devices that are functional without communication with other devices. Such handheld electronic devices are generally intended to be portable, and thus are of a relatively compact configuration in which keys and other structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable.

In language entry applications, such as in an email or other messaging application, a keypad must be capable of generating substantially all of the elements desirable or necessary to form the relevant language. For example, in a language that employs Roman letters, a keypad must be capable of generating substantially all twenty-six of the Roman letters. In order to provide such functionality with relatively few keys, some keypads have included multiple linguistic elements per key, such as providing a plurality of Roman letters on each of at least some of the keys when the keypad is used to generate a language that employs Roman letters.

In order to make use of the multiple linguistic elements on any given key, numerous keystroke interpretation systems have been provided. For instance, a "multi-tap system" allows a user to substantially unambiguously specify a particular linguistic element, for example, on a key by pressing the same key a number of times equal to the position of the desired linguistic element on the key. Another keystroke interpretation system includes key chording in which keys are pressed in various combinations to achieve particular results. Still another keystroke interpretation system might include a disambiguation routine which seeks to interpret the keystrokes in view of stored dictionary data, linguistic rules, stored algorithms, and/or the like.

When replying to a previously received message (which may be part of a larger message thread), a user of a handheld electronic device may often want to enter words that appear in the previous message thread. In current handheld electronic devices, users are required to simply type the desired words using the keyboard provided with the handheld electronic device. As will be appreciated, this text entry can at times be cumbersome, especially when lengthy or unfamiliar words are being entered. This is especially true for handled electronic devices having reduced keyboards and employing a keystroke interpretation system as described above because in some keystroke interpretation systems, a user must expend substantial effort in entering language. It thus would be desirable to provide a handheld electronic device, such as a device having a reduced keyboard, wherein the device might make available to a user for simplified entry words form an existing message thread that the user might reasonably be expected to enter.

BRIEF DESCRIPTION OF THE DRAWINGS

A full understanding of the invention can be gained from the following Description of the Preferred Embodiments when read in conjunction with the accompanying drawings in which:

FIG. 3 is a first exemplary output on the handheld electronic device of FIG. 1 showing a number of messages received thereby;

FIG. 5 is an exemplary output on the handheld electronic device of FIG. 1 in accordance with an aspect of the concept disclosed; and FIG. 6 is another exemplary output on the handheld electronic device of FIG. 1 in accordance with an aspect of the concept disclosed n;

FIG. 7 is still another exemplary output on the handheld electronic device of FIG. 1 in accordance with an aspect of the concept disclosed.

DESCRIPTION OF THE PREFERRED EMBODIMENTS

Figure 1:
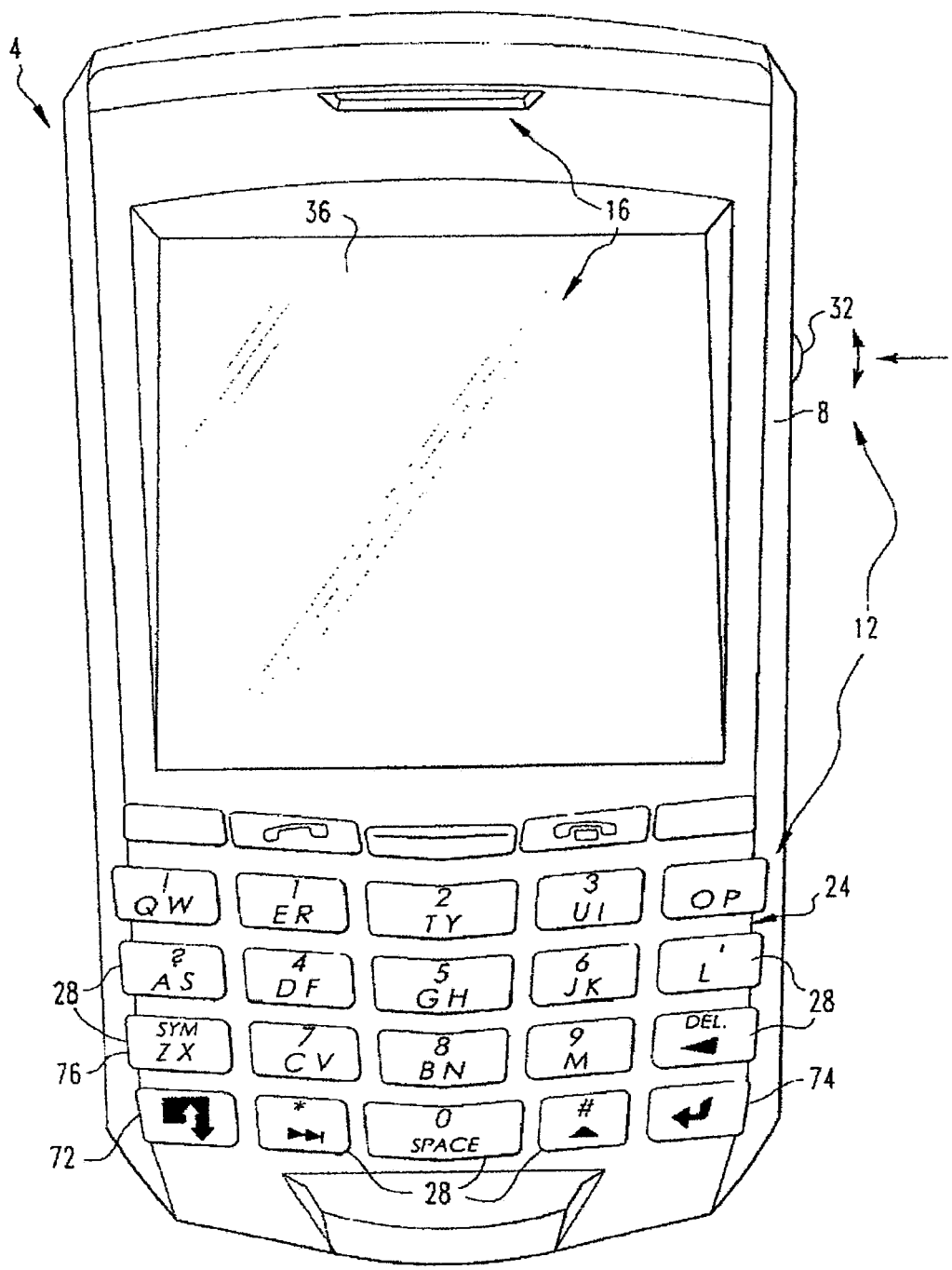
FIG. 1 is a front elevational view of an embodiment of an improved handheld electronic device in accordance with the concept disclosed herein.

A method of facilitating the entry of text into a new message generated by a messaging application of a handheld electronic device is provided that makes it easier for a user of the device to enter words from an existing message thread to which the user is responding. The method includes receiving a command to reply to or forward a received message that is included within a message thread, and scanning the message thread and identifying a plurality of words in the message thread. The method further includes generating one or more word lists that include the identified words, and displaying the one or more word lists. Finally, the method includes receiving a selection of a selected one of the words from the one or more word lists, and entering the selected one of the words into the new message. In one particular embodiment, each of the word lists represents a word category, and the generating step includes categorizing each of the identified words and placing each of the categorized words in one or more of the word lists based on how the word is categorized. For example, a first one of the word lists may represent a word category including words having at least a predetermined length, and the placing step may include placing all of the identified words having at least the predetermined length on the first one of the word lists. Alternatively, a plurality of the word lists may each represent a word category including words having a particular grammatical classification, such as noun or verb, and the placing step may include placing each of one or more of the identified words on an appropriate one of the plurality of word lists based on the grammatical classification of each word.

Also, the said scanning and generating steps may be performed automatically in response to receiving the command to reply to or forward a received message, such as a special "reply with word list" or "forward with word list" command selected from, for example, a menu provided on the handheld electronic device. Alternatively, the scanning, generating and displaying steps may be performed only after receiving a command form the user indicating a desire to have the word lists displayed so that the user can make selections therefrom.

In still a further alternative embodiment, the method further includes storing the one or more word lists, either on the handheld electronic device or on a separate device (e.g., PC) for archival purposes, and displaying the stored word lists when a subsequent message is generated using said handheld electronic device. For example, the word lists may be stored in association with the party that sent the originally received message, and the subsequent message in that case may be a message intended for that sender.

In another embodiment, a method of facilitating the entry of text into a new message generated by a messaging application of a handheld electronic device is provided that includes receiving a command to generate the new message, displaying a most frequently used words list that includes a predetermined number of words that have been determined to have been used most frequently by a user of the handheld electronic device in creating messages, receiving one or more word selections from the list, entering the selected into the new message, receiving manual input of text and entering the text into the new message, and updating the most frequently used words list based on the contents of the new message following the entering steps.

An improved handheld electronic device is also provided that includes an input apparatus, an output apparatus, and a processor apparatus including a processor and a memory. The memory has a messaging application executable by the processor that includes one or more routines adapted to implement the various embodiments of the method described herein.

Figure 2:
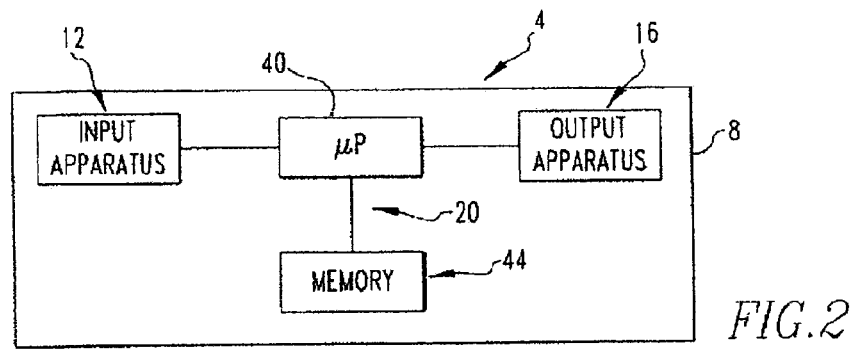
FIG. 2 is a block diagram of the handheld electronic device of FIG. 1.

An embodiment of an improved handheld electronic device 4 in accordance with the disclosed concept is indicated generally in FIGS. 1 and 2. The handheld electronic device 4 includes a case 8, an input apparatus 12, an output apparatus 16, and a processor apparatus 20. The present exemplary embodiment of the handheld electronic device 4 includes applications and/or routines resident thereon such as, for example, and without limitation, a disambiguation routine and an e-mail client, although other and/or additional applications and/or routines, such as various messaging applications (e.g., without limitation, SMS or MMS) can be provided without departing from the concept disclosed herein.

Referring to FIG. 1, the input apparatus includes a keypad 24 that includes a plurality of keys 28. The input apparatus 12 additionally includes a track wheel 32 for additional input. Many of the keys 28 have one or more letters assigned thereto, and some of the keys 28 have a plurality of letters assigned thereto. In the present exemplary embodiment, the exemplary letters are Roman letters, and the exemplary Roman letters serve as linguistic elements for language entry into the handheld electronic device 4. It is understood that while the linguistic elements of the instant exemplary embodiment are depicted as being characters, specifically Roman letters, the linguistic elements could be other elements such as, for example and without limitation, other types of characters, ideograms, portions of ideograms such as strokes, and other elements that can be used in the generation of language. The expressions "text" and "word", and variations thereof, are to be broadly construed herein and are not intended to be limiting in any fashion with regard to a particular language, a particular portion of a language or a means of providing an expression in a language, or to a particular language type or format.

The output apparatus 16 in the present exemplary embodiment includes a display 36. The output apparatus 16 may additionally include other output devices such as lights, speakers, and other output devices without limitation.

As can be seen in FIG. 2, the processor apparatus 20 includes a processor which may be, for instance and without limitation, a microprocessor (μP) 40 and which is responsive to inputs from the input apparatus 12 and provides output signals to the output apparatus 16. The processor apparatus 20 additionally includes a memory 44 with which the microprocessor 40 interfaces. The memory 44 can be any of a variety of storage devices such as, tar example and without limitation, RAM, ROM, EPROM, EEPROM, and/or other devices. In the exemplary embodiment, the memory 44 stores a number of routines executable by the microprocessor 40, such as, without limitation, a disambiguation routine as described elsewhere herein.

Although many uses for the disclosed concept will be apparent, one exemplary use is presented herein as being in the context of electronic mail, in which case the memory 44 will also store an email client (one or more software routines) executable by the microprocessor 40. As can be seen in FIG. 3, for example, a number of existing messages 52 are available on the handheld electronic device 4. That is, the messages 52 may either be stored directly on the handheld electronic device 4 or may be downloadable on demand, for example. The exemplary messages 52 in FIG. 3 each include, for instance, a sender 56 and a subject 60 for reference by the user.

In a situation where, for example, a user enters a replying or forwarding command with respect to one of the messages 52, the user may wish to enter certain words that were included in the message thread of which the message 52 is part (note, message 52 may be the only message in the thread, or, alternatively, one or more additional messages may be included in the message thread). The concept disclosed herein provides a method that may be implemented on the handheld electronic device 4 (or another device) in which a user is provided with assisted entry of text when replying to or forwarding an email message 52 based on the words that are included in the message thread that includes the email message 52.

Figure 4:
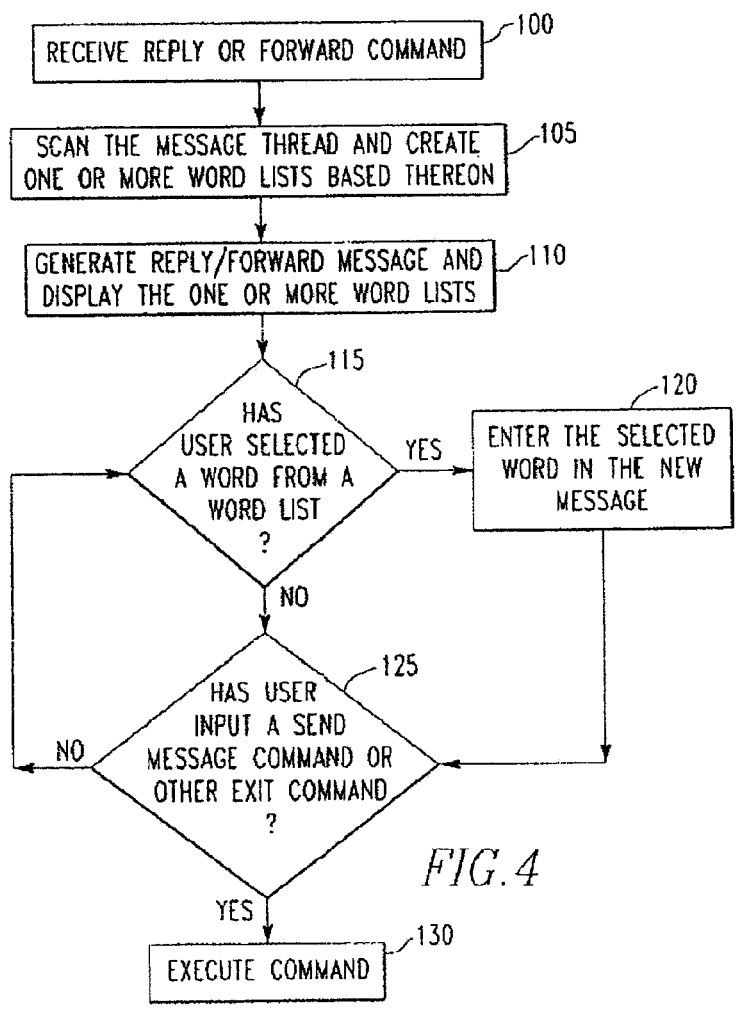
FIG. 4 is flowchart illustrating a method of facilitating the input of text into a new message according to an embodiment of the concept disclosed herein.

Referring to FIG. 4, the method begins at step 100, wherein the user enters and the processor apparatus 20 of the handheld electronic device 4 receives, in a known manner such as through a menu selection, a command to reply to or forward an email message 52, such as the email message 52 shown in FIG. 5. As seen in FIG. 5, the email message 52 includes a sender 56, a subject 60 and a message body 62. Although not shown in FIG. 5, it should be appreciated that email message 52 may be part of a message thread that includes more than just one message (i.e., more than just the email message 52), in which case information from the other emails in the message thread will typically follow the message body 62 shown in FIG. 5. Next, at step 105, the processor apparatus 20 scans the message thread that includes the email message 52 and creates one or more word lists from the words contained in the message thread. The word lists typically comprise one or more categories into which the identified words may be classified. As will be appreciated, this may be done in any number of ways. For example, in one embodiment, the processor apparatus 20 first scans the message thread and identifies all words having more than a predetermined number of characters, such as three characters. The processor apparatus 20 then classifies each identified word (having more than three characters) according to whether the word is a noun or a verb (or some other grammatical classification), and then as to whether the word exceeds a predetermined length, e.g., six characters. In this embodiment, it will be appreciated that a particular word may appear on more than one list (a seven character long verb will appear on two lists, the "verb" list and the "long words" list). In addition, in order to classify an identified word as a noun or verb (or some other grammatical classification), the word may be compared to dictionary information, for example in the form of a look-up table, stored in the memory 44. In an alternate embodiment, a single word list is created consisting of words that exceed a predetermined length, such as six characters. As will be appreciated by those skilled in the art, many other alternatives are also possible without departing from the scope of the disclosed concept.

Next, at step 110, a new email message (a reply or forward message) is created and the one or more lists created in step 105 are displayed to the user on the display 36 in connection with the new email message. For example, FIG. 6 shows such a new email message 64 in which the one or more lists created in step 105 are displayed in a word list window 66 provided on the display 36. FIG. 6 shows the embodiment wherein the identified words are classified as noun or verb and based on exceeding a certain length. It should be understood that this is meant to be exemplary only, and that other embodiments are also possible. As also seen in FIG. 6, the new email message 64 includes a message body 68 in which a user may enter text in a conventional manner using the input apparatus 12. As will be appreciated, this text entry may be facilitated using the disambiguation system (or some other keystroke interpretation system) implemented by the handheld electronic device 4. According to an aspect of the disclosed concept, the one or more lists created in step 105 are displayed in a manner that enables the user to select one of the words listed in the one or more lists using the input apparatus 12 and have that word be entered in the message body 68 at the location of the cursor 70. For example, as shown in FIG. 6, a user may select a word from the "Nouns" list by simultaneously pressing the ALT key 72 (FIG. 1) and the appropriate number that identifies the desired word. Similarly, a user may select a word from the "Verbs" list by simultaneously pressing the SHIFT key 74 (FIG. 1) and the appropriate number that identifies the desired word, or a word from the "Long" list by simultaneously pressing the Function key 76 (designated with the characters "SYM" in FIG. 1) and the appropriate number that identifies the desired word.

Referring again to FIG. 4, following step 110, the method proceeds to step 115, wherein a determination is made as to whether the user, through the input apparatus 12, has selected a word from one of the one or more lists displayed in step 110 in the word list window 66. If the answer at step 115 is yes, then, at step 120, the selected word is entered in the message body 68 at the location of the cursor 70. FIG. 7 shows the new email message 64 after the user has caused the word "jerseys" to be entered in the message body 68 by pressing "Function-4" on the input apparatus 12. Following step 120, the method proceeds to step 125, where a determination is made as to whether the user has input a send message command or another exit command. If the answer at step 125 is yes, then, at step 130, the command is executed. If, however, the answer at step 125 is no, then the method returns to step 115 for further processing as described herein. As seen in FIG. 15, if the answer at step 115 is no, then the method proceeds to step 125 and processing proceeds as described above.

Thus, the method shown in FIG. 4 enables the user of the handheld electronic device 4 to more easily enter text when responding to or forwarding an email message, such as an email message 52, by providing for the selection and entry of words derived from the message thread that includes the message being replied to or forwarded. Various manners of initiating the method shown in FIG. 4 during use of the handheld electronic device 4 are possible. In one embodiment, the method shown in FIG. 4 is automatically initiated whenever a user replies to or forwards an email message. In another embodiment, the method shown in FIG. 4 is initiated only when a user replies to or forwards an email message using a special reply or forward command, such as a "reply with word list" or "forward with word list" command selected from a menu in a known manner. In still another embodiment, the method may be initiated in the middle of replying to or forwarding an email message by making a particular menu selection, such as a "display word list" menu selection, in a known manner or by otherwise entering a predetermined command using the input apparatus, such as by pressing a particular combination of keys 26. In such a case, after the menu selection or command, the word lists described herein may be created and the word list window 66 may be displayed on the display 36.

In an alternative embodiment, the one or more lists created in step 105 are saved in the memory 44 in connection with the sender 56 (i.e., the sender of the message 52 in the message thread on which the one or more words lists were based). When the user of the handheld electronic device 4 sends another message to that same user at some later time, the one or more word lists that were saved in the memory 44 may be made available to the user in a word list window 66 so that the user can select one or more words therefrom in the manner described elsewhere herein for inclusion in the text of the message being created. As a further alternative, the one or more words lists may be backed up/saved on another electronic device, such as a separate PC, for archiving purposes. The archived word lists may later be accessed for use as described herein.

In a further embodiment, the processor apparatus 20 is adapted to generate, store and maintain/update a list of a predetermined number of words that have been determined to have been used most frequently by the user of the handheld electronic device in creating email messages over a predetermined period of time (a so called "My Wordlist" feature). The predetermined number of words may be any number, such as a reasonably manageable number like fifteen or twenty words. Preferably, although not necessarily, the words that are considered for inclusion on the most frequently used words list may be limited to only those words having at least a predetermined number of characters, such as four or more characters. In addition, the predetermined period of time may be any period, such as, without limitation, a period beginning at the initiation of use of the handheld electronic device 4 by the user and extending to the present or a period beginning at a list reset time (set by the user) and extending to the present.

Figure 8:
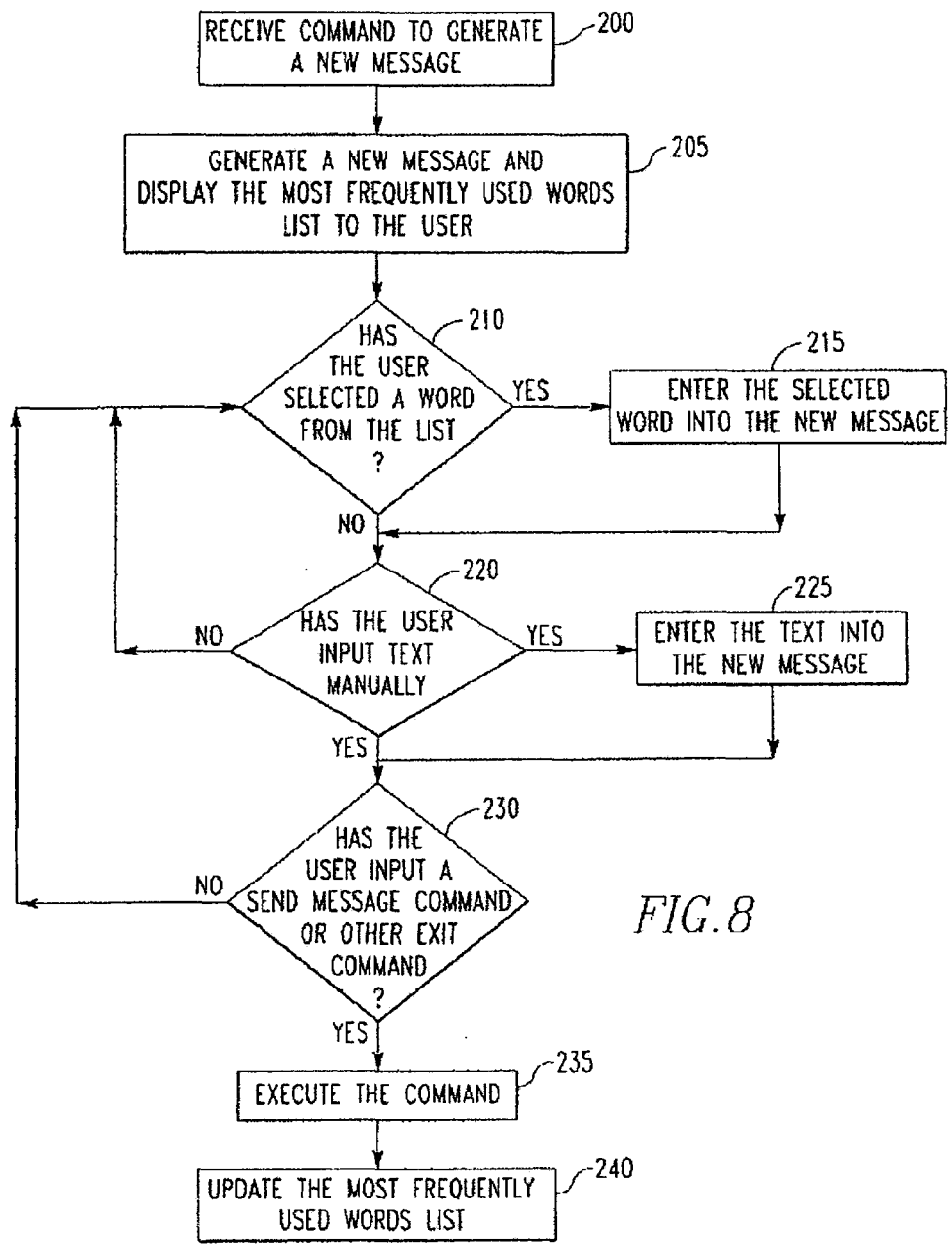
FIG. 8 is a flowchart showing a method of implementing a most frequently used words list in accordance with a further aspect of the concept disclosed herein Similar numerals refer to similar parts throughout the specification.

FIG. 8 is a flowchart showing a method of implementing a most frequently used words list as described above on the handheld electronic device 4 according to one embodiment. The method begins at step 200, wherein the user enters and the processor apparatus 20 of the handheld electronic device 4 receives, in a known manner such as through a menu selection, a command to generate a new email message. Next, at step 205, a new email message is created and the most frequently used words list stored by the processor apparatus 20, and in particular the memory 44, is displayed to the user on the display 36 (e.g., in a window similar to word list window 66) in connection with the new email message. According to an aspect of the disclosed concept, the most frequently used words list is displayed in a manner that enables the user to select one of the words listed therein using the input apparatus 12 and have that word be entered in the message body of the new email message. For example, the words on the most frequently used words list may be numbered sequentially, and a user may select a word from the most frequently used words list by simultaneously pressing a predetermined key 26, such as the ALT key 72 or the SHIFT key 74 (FIG. 1), and the number that identifies the desired word. The words on the most frequently used words list may also be categorized as described elsewhere herein (e.g., nouns, verbs, long), and may be selected from the appropriate category in the manner described elsewhere herein.

Following step 205, the method proceeds to step 210, wherein a determination is made as to whether the user, through the input apparatus 12, has selected a word from the most frequently used words list. If the answer at step 210 is yes, then, at step 215, the selected word is entered in the message body of the new email message at the location of the cursor therein. Following step 215, or if the answer at step 210 is no, the method proceeds to step 220 where a determination is made as to whether the user has manipulated the input apparatus 12 to input text manually. If the answer is yes, then, at step 225, the manually input text is entered in the message body of the new email message at the location of the cursor therein.

Following step 225, or if the answer at step 220 is no, the method proceeds to step 230, where a determination is made as to whether the user has input a send message command or another exit command. If the answer at step 230 is no, then the method returns to step 210 for further processing. However, if the answer at step 230 is yes, then, at step 235, the command is executed. Next, at step 240, the most frequently used words list is updated based on the contents of the new email message just generated, and preferably only if the email is actually sent. To implement this step, the processor apparatus 20 may maintain a database of word usage that tracks the frequency of use of all words that are eligible for inclusion on the most frequently used words list (e.g., all words longer than say four characters). Each time a new email is sent (see step 235), the eligible words in that email message are extracted and their use is recorded in the database. Based on this use, the relative frequencies of all of the words therein may be determined/ adjusted, and the top (most frequent) predetermined number of words is selected for inclusion on the updated most frequently used words list. Once updated, the most frequently used words list is stored for use in step 205 as needed. It will be understood that this is just one particular implementation of updating the most frequently used words list and that other implementations are also possible without departing from the scope of the present concept.

While specific embodiments of the invention have been described in detail, it will be appreciated by those skilled in the art that various modifications and alternatives to those details could be developed in light of the overall teachings of the disclosure. For example, the concept disclosed herein has, for illustrative purposes, been described in connection with email messages and an email application. It should be appreciated, however, that other types of messages and messaging application may be involved, such as, without limitation, SMS, MMS, and instant messaging. Accordingly, the particular arrangements disclosed are meant to be illustrative only and not limiting as to the scope of the invention which is to be given the full breadth of the claims appended and any and all equivalents thereof.

What is claimed is:

1. A method comprising:
    receiving one or more messages;
    scanning, using a processor, the one or more received messages to identify a set of words in the one or more received messages;
    generating, from the identified set of words, a word list including one or more words having a same grammatical classification; and
    displaying the word list in connection generating a reply to at least one of the one or more messages, wherein each word in the word list is selectable to include in the reply.

2. The method of claim 1, further comprising:
    categorizing the identified set of words.

3. The method of claim 2, further comprising:
    placing each of the identified words into the set of word lists based on the categorization.

4. The method of claim 1, wherein the word list is a word list representing nouns and the second word list is a word list representing verbs.

5. The method of claim 1, further comprising:
    determining whether each of the identified words is longer than a predetermined length.

6. The method of claim 1, further comprising:
    generating, from the identified set of words, a second word list including one or more words having a second grammatical classification, wherein the second grammatical classification is different than the same grammatical classification.

7. A handheld apparatus comprising:
    one or more processors;
    one or more memory devices;
    program code stored on the one or more memories, which, when executed by the one or more processors, causes the apparatus to perform the steps of:
    receiving one or more messages;
    scanning the one or more of received messages to identify a set of words in the one or more received messages;
    generating, from the identified set of words, a word list of one or more words having a same grammatical classification; and
    outputting the word list to a display in connection generating a reply to at least one of the one or more messages, wherein each word in the word list is selectable to include in the reply.

8. The handheld apparatus of claim 7, wherein the program code, when executed by the one or more processors, further causes the apparatus to perform the step of:
    categorizing the identified set of words.

9. The handheld apparatus of claim 8, wherein the program code, when executed by the one or more processors, further causes the apparatus to perform the step of:
    placing each of the identified words into the set of word lists based on the categorization.

10. The handheld apparatus of claim 7, wherein the word list is a word list representing nouns and the second word list is a word list representing verbs.

11. The handheld apparatus of claim 7, wherein the program code, when executed by the one or more processors, further causes the apparatus to perform the step of:
determining whether each of the identified words is longer than a predetermined length.

12. The handheld apparatus of claim 7, wherein the program code, when executed by the one or more processors, further causes the apparatus to perform the step of:
generating, from the identified set of words, a second word list including one or more words having a second grammatical classification, wherein the second grammatical classification is different than the same grammatical classification.

13. A non-transitory computer-readable medium comprising instructions that, when executed by one or more processors, configure the one or more processors to:
receive one or more messages;
scan the one or more received messages to identify a set of words in the one or more received messages;
generate, from the identified set of words, a word list including one or more words having a same grammatical classification; and
output the word list to a display in connection generating a reply to at least one of the one or more messages, wherein each word in the word list is selectable to include in the reply.

14. The non-transitory computer-readable medium of claim 13, wherein the instructions, when executed by one or more processors, further configure the one or more processors to:
categorize the identified set of words.

15. The non-transitory computer-readable medium of claim 14, wherein the instructions, when executed by one or more processors, further configure the one or more processors to:
place each of the identified words into the set of word lists based on the categorization.

16. The non-transitory computer-readable medium of claim 13, wherein the word list is a word list representing nouns and the second word list is a word list representing verbs.

17. The non-transitory computer-readable medium of claim 13, wherein the instructions, when executed by one or more processors, further configure the one or more processors to:
determine whether each of the identified words is longer than a predetermined length.

18. The non-transitory computer-readable medium of claim 13, wherein the instructions, when executed by one or more processors, further configure the one or more processors to:
generating, from the identified set of words, a second word list including one or more words having a second grammatical classification, wherein the second grammatical classification is different than the same grammatical classification.

* * * * *